United States Patent
Shimizu et al.

(10) Patent No.: US 9,163,755 B2
(45) Date of Patent: Oct. 20, 2015

(54) FLOW PASSAGE COMPONENT

(71) Applicant: NGK Insulators, Ltd., Nagoya (JP)

(72) Inventors: Hideki Shimizu, Obu (JP); Takashi Ebigase, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 109 days.

(21) Appl. No.: 14/035,396

(22) Filed: Sep. 24, 2013

(65) Prior Publication Data

US 2014/0069545 A1 Mar. 13, 2014

Related U.S. Application Data

(63) Continuation of application No. PCT/JP2012/057572, filed on Mar. 23, 2012.

(30) Foreign Application Priority Data

Mar. 25, 2011 (JP) .................................. 2011-068721

(51) Int. Cl.
*F16L 9/14* (2006.01)
*B41J 2/14* (2006.01)
*B41J 2/16* (2006.01)

(52) U.S. Cl.
CPC ................. *F16L 9/14* (2013.01); *B41J 2/1433* (2013.01); *B41J 2/14233* (2013.01); *B41J 2/1606* (2013.01)

(58) Field of Classification Search
CPC ................. F16L 9/14; B41J 2/16; B41J 2/164
USPC ............... 138/140, 141, 145, 146; 347/71, 45
See application file for complete search history.

(56) References Cited

U.S. PATENT DOCUMENTS

| | | | |
|---|---|---|---|
| 4,890,126 A | 12/1989 | Hotomi | |
| 6,652,069 B2 * | 11/2003 | Toda et al. | 347/45 |
| 7,066,582 B2 * | 6/2006 | Deguchi et al. | 347/68 |
| 7,628,470 B2 * | 12/2009 | Mita | 347/58 |
| 8,240,819 B2 * | 8/2012 | Seki | 347/71 |

(Continued)

FOREIGN PATENT DOCUMENTS

| | | |
|---|---|---|
| JP | 01-195053 A1 | 8/1989 |
| JP | 07-101068 A1 | 4/1995 |

(Continued)

OTHER PUBLICATIONS

International Search Report and Written Opinion dated Apr. 24, 2012.

*Primary Examiner* — Patrick F Brinson
(74) *Attorney, Agent, or Firm* — Burr & Brown, PLLC

(57) ABSTRACT

A flow passage component according to the present invention is a component composed of ceramics, which forms a flow passage through which a liquid flows. The flow passage has a discharge opening at an end of the flow passage, for discharging the liquid in the flow passage to a space outside of the flow passage component. The discharge opening is exposed to the outside space. A flow passage wall surface forming the flow passage is covered by/with a protection film (parylene-film) formed of a paraxylylene-based polymer. Further, the parylene-film is formed so as to have its end at a position upstream of the discharge opening by a predetermined distance along the flow passage wall surface from the discharge opening. This can decrease a possibility that the liquid goes around the "outer wall surface on which the discharge opening is formed."

3 Claims, 8 Drawing Sheets

(56) References Cited

U.S. PATENT DOCUMENTS

| | | |
|---|---|---|
| 2003/0150113 A1 | 8/2003 | Ito et al. |
| 2004/0032466 A1* | 2/2004 | Deguchi et al. .................. 347/67 |
| 2006/0099888 A1 | 5/2006 | Ishibashi et al. |
| 2006/0176344 A1* | 8/2006 | Mita ................................ 347/71 |
| 2010/0238237 A1* | 9/2010 | Seki ................................ 347/71 |
| 2010/0245475 A1* | 9/2010 | Masashi et al. .................. 347/45 |
| 2012/0200642 A1* | 8/2012 | Barker et al. .................... 347/71 |
| 2013/0136870 A1* | 5/2013 | Walsh et al. .................... 427/555 |

FOREIGN PATENT DOCUMENTS

| | | |
|---|---|---|
| JP | 08-309997 A1 | 11/1996 |
| JP | 2002-307692 A1 | 10/2002 |
| JP | 2003-300328 A1 | 10/2003 |
| JP | 2005-153510 A1 | 6/2005 |
| JP | 2006-159402 A1 | 6/2006 |
| JP | 2006-159858 A1 | 6/2006 |
| JP | 2006-218858 A1 | 8/2006 |

\* cited by examiner

FLOW PASSAGE COMPONENT

BACKGROUND OF THE INVENTION

1. Field of the Invention

The present invention relates to a flow passage component forming a flow passage through which a liquid flows in its inside.

2. Description of Related Art

Conventionally, a "flow passage component composed of ceramics, or the like" is known, which includes a flow passage through which a liquid passes in its inside, and which injects the liquid from an opening which is an end of the flow passage and is formed on an outer wall surface. Such a flow passage component is used in a wide variety of fields, for example, as a device for producing a DNA chip, an "actuator for injecting a liquid" (e.g., a fuel injection device), an ink injection device for an ink jet printer, a fuel cell (SOFC), a switching device, and a sensor.

A wall surface (flow passage wall surface) forming the flow passage of the flow passage component may be covered by/with a protection film formed of a paraxylylene-based polymer for the purpose of improving a water-resistance property, a chemical resistance property, an electrical insulation property, a heat resistance property, a strength, or the like (refer to a patent literature 1). The paraxylylene-based polymer may also be referred to as "Parylene (Trademark)." Accordingly, the protection film formed of the paraxylylene-based polymer is also simply referred to as a "parylene-film."

CITATION LIST

Patent Literature

[PTL 1] Japanese Patent Application Laid-Open (Kokai) No. 2002-307692

SUMMARY OF THE INVENTION

FIG. 14 is an enlarged sectional view of a portion in the neighborhood of a discharge opening of the flow passage component described in the above patent literature 1. The flow passage R is formed by wall surface 101a, 101a of a member 101, 101 composed of ceramics or the like. A "nozzle plate 103 in which a discharge hole 102 is formed" is joined to an outer wall surface 101b of the member 101, 101 where the discharge opening is formed. Further, a parylene-film 104 is formed on the wall surface (flow passage wall surface) 101a, 101a forming the flow passage R. An end portion of the parylene-film 104 extends to the discharge opening. That is, the end portion of the parylene-film 104 is positioned on a "surface where the outer wall surface 101b and an inner wall surface 103a of the nozzle plate 103 contact with each other."

However, wettability of the passage wall surface on which the parylene-film 104 is formed is greatly different from wettability of a side wall surface of the discharge hole 102. Accordingly, when starting to discharge the liquid and/or ending the discharge, there may be a case in which the discharge operation does not immediately start and/or stop (i.e., an instant operation ability is not excellent).

In view of the above, as shown in FIG. 15, a flow passage component is conceived, in which the nozzle plate 103 is eliminated so that the discharge opening of the flow passage component composed of the ceramics or the like is exposed to the outside space, and the liquid is directly discharged from the discharge opening.

Nevertheless, since the wettability of the parylene-film 104 with respect to a liquid other than a "liquid having an extremely high surface tension such as water, and the like" is remarkably excellent, the liquid goes around the outer wall surface 101b as show by an arrow A1 in FIG. 15, and thus, there is a problem that it is difficult to stably discharge the liquid. In view of the above, one of objects of the present invention is to provide a flow passage component in which a flow passage wall surface forming a flow passage through which a liquid passes is protected by a protection film which is a parylene-film, the flow passage component having a lower possibility for the liquid to go around an "outer wall surface on which a discharge opening is formed."

The flow passage component according to the present invention is a component in which a discharge opening for discharging a liquid to an outside space is formed on an outer wall surface exposed to the outside space, and a flow passage of the liquid is formed in its inside, the flow passage having the discharge opening at one end of the flow passage, wherein, a flow passage wall surface forming the flow passage is covered by/with a protection film (parylene-film) formed of a paraxylylene-based polymer, and the protection film is formed so as to have its end at a position upstream of the discharge opening by a predetermined distance D (refer to a distance D shown in FIG. 7) along the flow passage wall surface from the discharge opening.

According to the configuration above, since the protection film is not present in the vicinity of the discharge opening, the "wettability with respect to the liquid flowing through the flow passage" of the flow passage wall surface in the vicinity of the discharge opening can be lowered. As a result, the possibility that the liquid to be discharged from the discharge opening goes around the "outer wall surface on which the discharge opening is formed" is decreased.

In this case, as shown in FIG. 13, when the liquid is being discharged through the discharge opening, a part, but not so much, of the liquid counterflows (refer to an arrow A2). Accordingly, the liquid collides with the end of the protection film (parylene-film 20'), and therefore, a possibility that the protection film (20') removes (delaminates) from the flow passage wall surface becomes slightly higher.

In view of the above, it is preferable that the protection film be formed in such a manner that a film thickness of a portion of the film becomes smaller as the portion comes closer to the discharge opening.

According to the configuration above, as shown in FIG. 7, the liquid which counterflows is not generated, and thus, the possibility that the protection film (parylene-film 20) removes from the flow passage wall surface can be decreased. In other words, since the adhesion property between the protection film (20) and the flow passage wall surface is improved, the reliability of the flow passage component can be enhanced.

Other objects, features, and advantages of the present invention device will be readily understood from the following description of each of embodiments of the present invention with reference to the accompanying drawings.

DETAILED DESCRIPTION OF THE INVENTION

Figure 1:
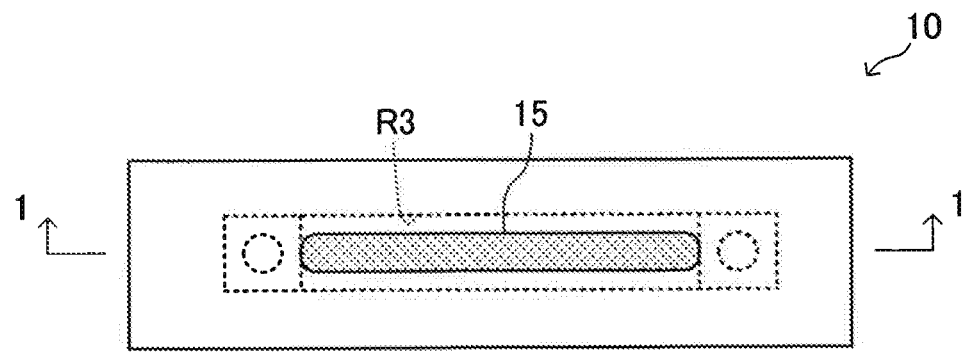
FIG. 1 is a plan view of a flow passage component of an embodiment according to the present invention.
Figure 1:
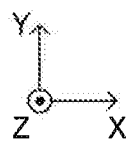
Figure 2:
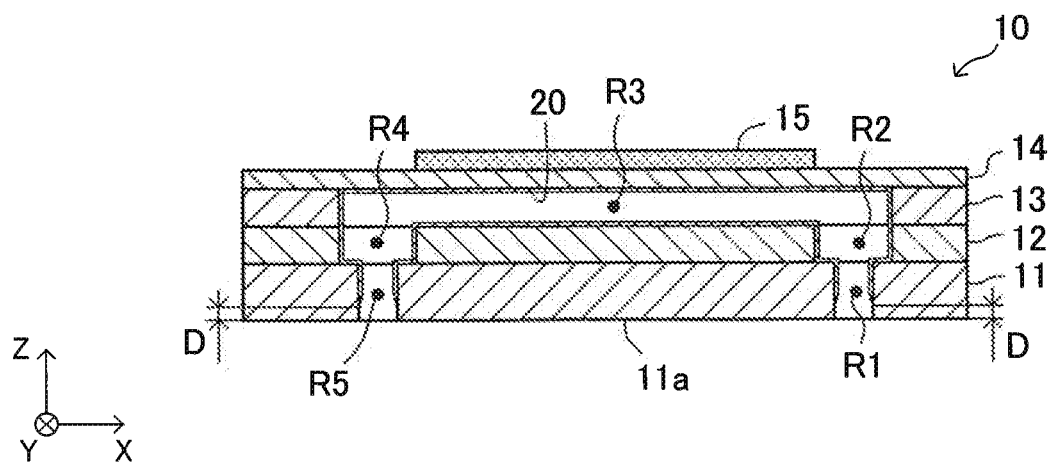
FIG. 2 is a sectional view of the flow passage component, cut by a plane along 1-1 line shown in FIG. 1.
Figure 2:
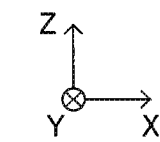

A flow passage component (liquid discharge actuator, liquid discharge device) of an embodiment according to the present invention will next be described. FIG. 1 is a plan view of the flow passage component 10. FIG. 2 is a sectional view of the flow passage component 10, cut by a plane along 1-1 line shown in FIG. 1.

The flow passage component 10 has a shape of a rectangular parallelepiped having sides, each of which is parallel with one of an X-axis, a Y-axis, and a Z-axis, orthogonal to each other. Accordingly, as shown in FIG. 1, a shape of the flow passage component 10 in plan view (when the flow passage component 10 is viewed along the Z-axis from a Z-axis positive direction side) is a rectangular. A long side and a short side of the rectangular are parallel with the X-axis and the Y-axis, respectively. A height direction of the flow passage component 10 is parallel with the Z-axis. It should be noted that the positive direction of the Z-axis is defined as an upper direction, and the negative direction of the Z-axis is defined as a lower direction, for the sake of description.

The flow passage component 10 includes a plurality of ceramics thin plates (hereinafter, referred to as "ceramics sheets") 11 to 14, and a piezoelectric element 15. FIGS. 3 to 6 are plan views of the ceramics sheets 11 to 14, respectively. The ceramics sheets 11 to 14 are layered upwardly in this order and press-bonded, and thereafter, unified by firing. The piezoelectric element 15 is provided/fixed onto an upper surface of the ceramics sheet 14.

The thus configured flow passage component 10 forms a single flow passage (liquid channel) in its inside, the flow passage composed of a flow passage R1 (first flow passage portion R1), a flow passage R2 (second flow passage portion R2), a flow passage R3 (third flow passage portion R3), a flow passage R4 (fourth flow passage portion R4), and a flow passage R5 (fifth flow passage portion R5).

The flow passage R1 has a hollow cylindrical shape having a central axis parallel with the Z-axis. The flow passage R1 is formed at a central region of the flow passage component 10 in the Y-axis direction, and in the vicinity of an end in the X-axis positive direction of the flow passage component 10.

The flow passage R5 has a hollow cylindrical shape having a central axis parallel with the Z-axis. The flow passage R5 is formed at a central region of the flow passage component 10 in the Y-axis direction, and in the vicinity of an end in the X-axis negative direction of the flow passage component 10.

Figure 3:
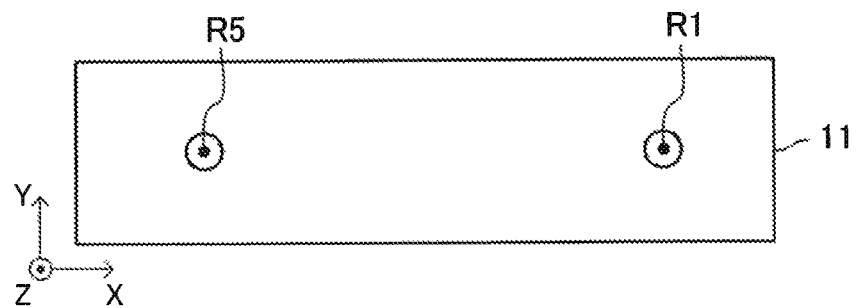
FIG. 3 is a plan view of one of ceramics sheets shown in FIG. 2.

In other words, as shown in FIG. 3, the ceramics sheet 11 comprises through holes at positions corresponding to the flow passage R1 and the flow passage R5 to form the flow passage R1 and the flow passage R5, respectively.

The flow passage R1 forms an inflow opening for having a liquid flow into the flow passage component 10 (or into the liquid flow passage) on the lower surface of the ceramics sheet 11 (and accordingly, on the lower surface of the flow passage component 10, or on the lower outer wall surface 11a of the flow passage component 10).

Similarly, the flow passage R5 forms a discharge opening for discharging the liquid from the flow passage component 10 (or from the liquid flow passage) to the outside space on the lower surface of the ceramics sheet 11 (and accordingly, on the lower surface of the flow passage component 10, or on the lower outer wall surface 11a of the flow passage component 10). It should be noted that a diameter of the flow passage R5 is 100 μm, and a length (height) along the Z-axis direction of the flow passage R5 is 100 μm. Needless to say, those dimensions are exemplary, and the diameter and the height may be different from those dimensions.

The flow passage R2 has a hollow quadratic prism-like shape (rectangular parallelepiped shape). The flow passage R2 is formed at the central region of the flow passage component 10 in the Y-axis direction, and in the vicinity of the end in the X-axis positive direction of the flow passage component 10 (i.e., at a portion directly above the flow passage R1).

The flow passage R4 has a hollow quadratic prism-like shape (rectangular parallelepiped shape). The flow passage R4 is formed at the central region of the flow passage component 10 in the Y-axis direction, and in the vicinity of the end in the X-axis negative direction of the flow passage component 10 (i.e., at a portion directly above the flow passage R5).

Figure 4:
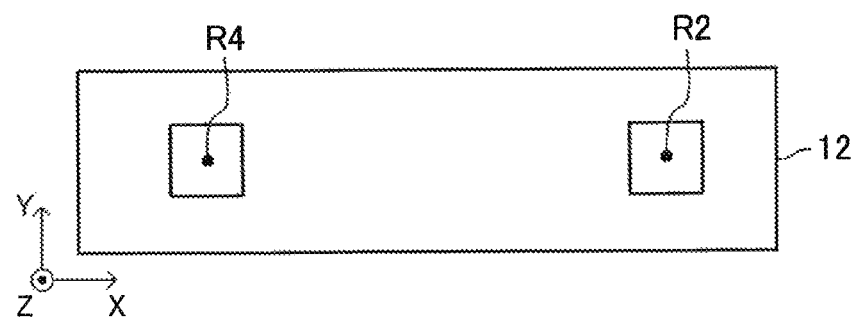
FIG. 4 is a plan view of another of the ceramics sheets shown in FIG. 2.

In other words, as shown in FIG. 4, the ceramics sheet 12 comprises through holes at positions corresponding to the flow passage R2 and the flow passage R4 to form the flow passage R2 and the flow passage R4, respectively.

The flow passage R3 has a hollow quadratic prism-like shape (rectangular parallelepiped shape). The flow passage R3 is formed at the central region of the flow passage component 10 in the Y-axis direction, and at the central region of the flow passage component 10 in the X-axis direction (i.e., at portions directly above the flow passages R2 and R4, and a portion corresponding to between those portions).

Figure 5:
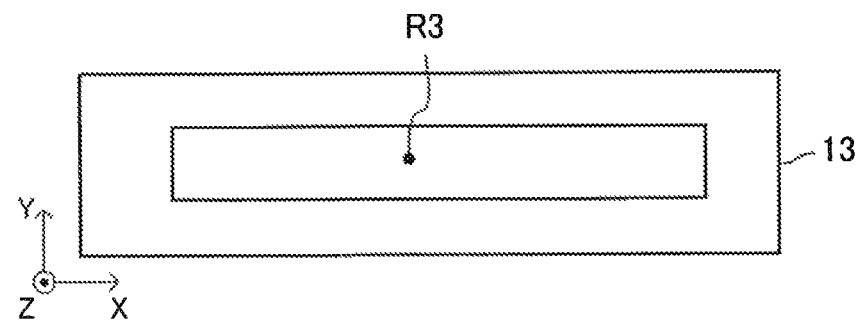
FIG. 5 is a plan view of another of the ceramics sheets shown in FIG. 2.
Figure 6:
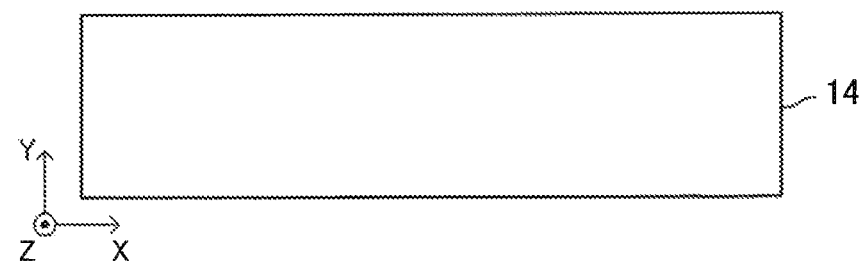
FIG. 6 is a plan view of another of the ceramics sheets shown in FIG. 2.

In other words, as shown in FIG. 5, the ceramics sheet 13 comprises a through hole to form the flow passage R3 at the position corresponding to the flow passage R3.

As shown in FIGS. 1 and 2, the piezoelectric element 15 is fixed on the upper surface of the ceramics sheet 14. The piezoelectric element 15 is provided at a portion directly above the flow passage R3. The piezoelectric element 15 comprises an unillustrated upper electrode and an unillustrated lower electrode. When a driving voltage is applied to between those electrodes, the piezoelectric element 15 deforms the ceramics sheet 14 to thereby change a volume of the flow passage R3. This pressurizes the liquid in the liquid flow passage, and thus, the liquid is discharged from the discharge opening of the flow passage component 10 to the space outside of the flow passage component 10 through the flow passages R4 and R5. At this moment, the flow passage is refilled with the liquid through the flow passage R1 (inflow opening) from the outside.

It should be noted that the material for the flow passage component 10 is not limited to the ceramics. For example, the flow passage component 10 may be formed with a first sheet which is composed of silicon or SUS and has the same shape as the shape of the ceramics sheet 11 in place of the ceramics sheet 11, and the ceramics sheets 12 to 14. In this case, in order to manufacture the flow passage component 10, the ceramics sheets 12 to 14 are layered and press-bonded, and then, fired to be unified, and further, the first sheet is adhered to the lower surface of the ceramics sheet 12 with an epoxy adhesive.

As shown in FIG. 2, a protection film (parylene-film) 20 composed of paraxylylene-based polymer is formed on the flow passage wall surface that constitutes the flow passage (flow passages R1 to R5). The ceramics sheet (vibration plate) 14 which is deformed by the piezoelectric element 15 is a thin plate, and thus, the strength of the ceramics sheet 14 may be insufficient. However, in the present example, the strength of the ceramics sheet 14 can be enhanced with the parylene-film 20. Further, deficiencies in the ceramics sheet 14 and the like can be filled with the parylene-film 20.

Figure 7:
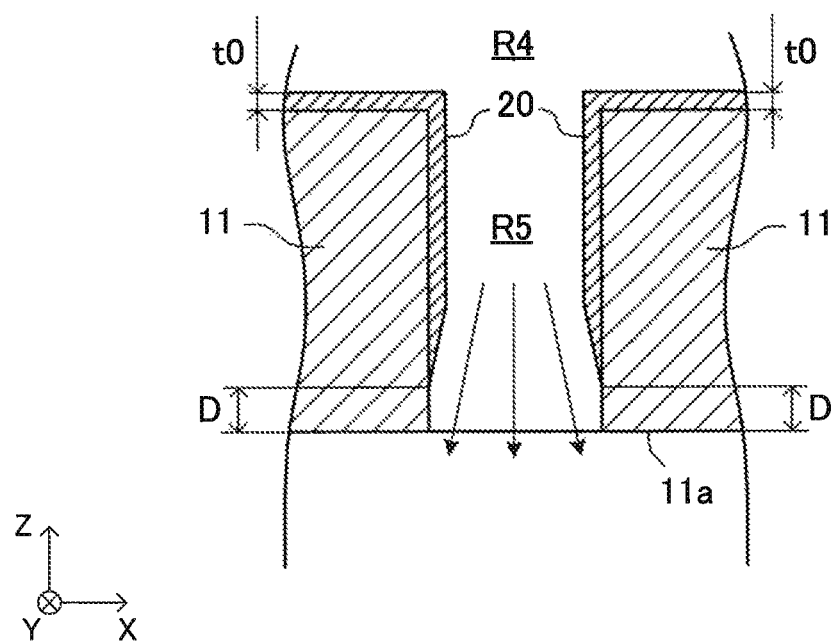
FIG. 7 is an enlarged sectional view of a portion in the vicinity of a discharge opening of the flow passage component shown in FIGS. 1 and 2.

As shown in FIG. 7, the parylene-film 20 is formed so as to have its end at a position upstream of the discharge opening by a predetermined distance D along the flow passage wall surface from the discharge opening (lower end surface of the fifth flow passage R5).

According to the configuration above, since the parylene-film 20 is not present in the vicinity of the discharge opening, "wettability with respect to the liquid flowing through the flow passage" of the flow passage wall surfaces in the vicinity of the discharge opening can be lowered. As a result, the possibility that the liquid to be discharged from the discharge opening goes around the "outer wall surface 11a on which the discharge opening is formed" is decreased.

Further, the film thickness t of the parylene-film 20 is approximately constant (t0) at almost all portions of the film. However, the parylene-film 20 is formed in such a manner that the film thickness of the film becomes smaller as a portion of the film comes closer to the discharge opening. In other words, since the shape of the flow passage (flow passage R5) in the vicinity of the discharge opening is hollow cylindrical, the parylene-film 20 is formed in such a manner that the diameter of the flow passage defined by a surface (exposed surface, inner surface) of the parylene-film 20 becomes larger as a portion of the flow passage comes closer to the discharge opening along the central axis of the flow passage.

Figure 13:
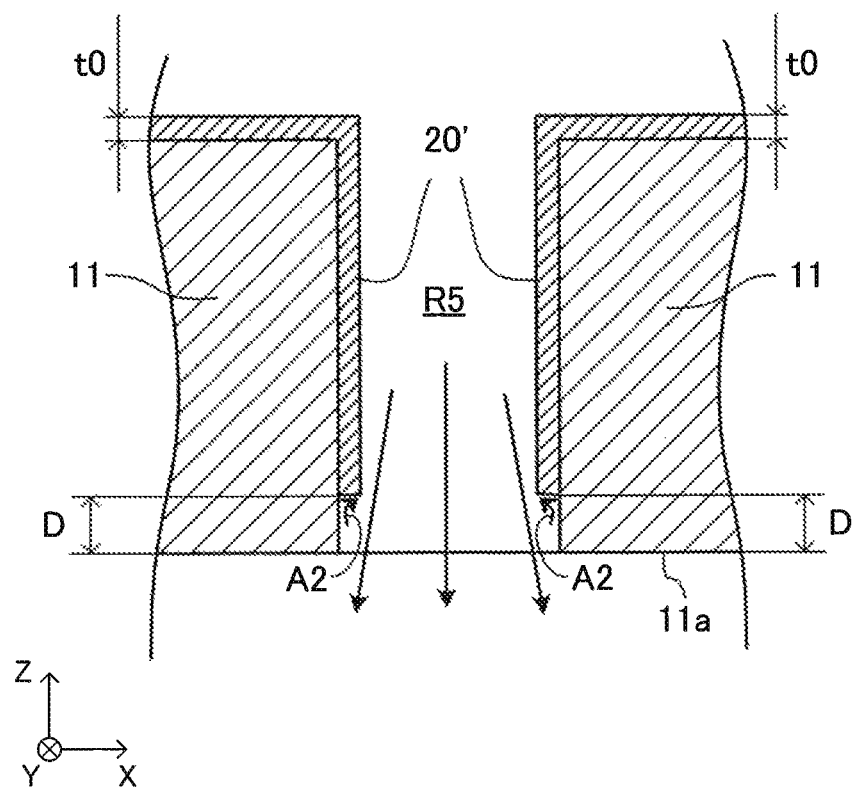
FIG. 13 is a plan view of a flow passage component of a modified embodiment according to the present invention.
Figure 14:
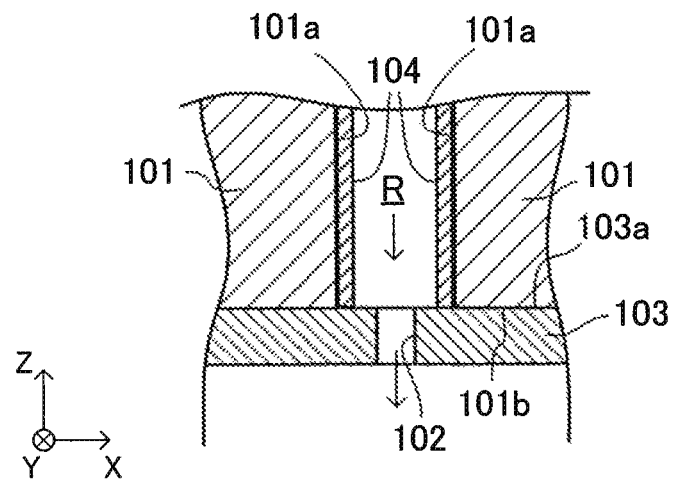
FIG. 14 is an enlarged sectional view of a portion in the vicinity of a discharge opening of a conventional flow passage component.
Figure 15:
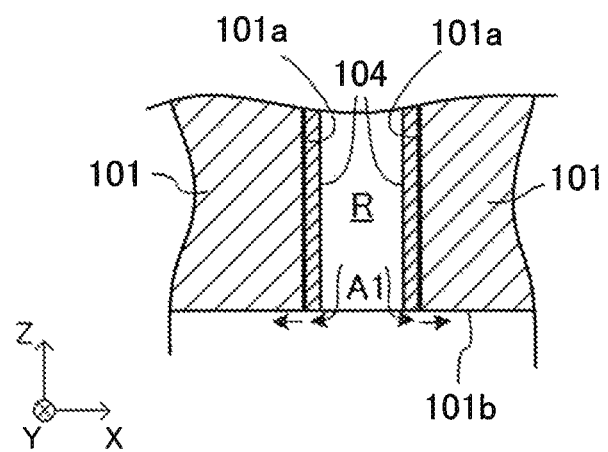
FIG. 15 is an enlarged sectional view of a portion in the vicinity of a discharge opening of a flow passage component which has been studied.

Meanwhile, as shown in FIG. 13, if the film thickness of the parylene-film 20 is constant (t0) all through up to the end of the film (such a parylene-film having the constant film thickness is referred to as a "parylene-film 20'"), a part, but not so much, of the liquid counterflows as shown by the arrow A2 when the liquid is being discharged from the discharge opening. Accordingly, the liquid collides with the end of the parylene-film 20', and therefore, a possibility that the parylene-film 20' removes (delaminates) from the flow passage wall surface becomes slightly higher.

In contrast, as the parylene-film 20 shown in FIG. 7, when the film is formed in such a manner that the film thickness of the portion of the film becomes smaller as the portion comes closer to the discharge opening, the liquid which counterflows is not generated, and thus, the possibility that the parylene-film 20 removes from the flow passage wall surface can be decreased. As a result, since the adhesion property between the parylene-film 20 and the flow passage wall surface is improved, the reliability of the flow passage component 10 can be enhanced.

Similarly, as shown in FIG. 2, the parylene-film 20 is formed so as to have its end at a position downstream of the inflow opening by a predetermined distance D along the flow passage wall surface from the inflow opening (lower end surface of the first flow passage R1).

In addition, the parylene-film 20 is formed in such a manner that the film thickness of the film becomes smaller as a portion of the film comes closer to the inflow opening.

Accordingly, when the liquid flows into the flow passage from the inflow opening, the liquid smoothly flows on the surface of the parylene-film 20, and thus, presses the parylene-film 20 to the flow passage wall surface. As a result, the possibility that the parylene-film 20 removes from the flow passage wall surface can be further decreased. In other words, since the adhesion property between the parylene-film 20 and the flow passage wall surfaces is improved, the reliability of the flow passage component 10 can be enhanced.

Next, a manufacturing method of the flow passage component 10 will be described.

(Forming Process of a Layered Body for the Flow Passage Component)

Firstly, ceramics sheets (ceramics green sheets) 11-14 that have not been fired are prepared (refer to FIGS. 3 to 6). The material for those sheets is not limited as long as it is ceramics material. However, it is preferable that it be ceramics containing partially-stabilized zirconia or stabilized zirconia as a main component, from a viewpoint of a high strength.

Figure 8:
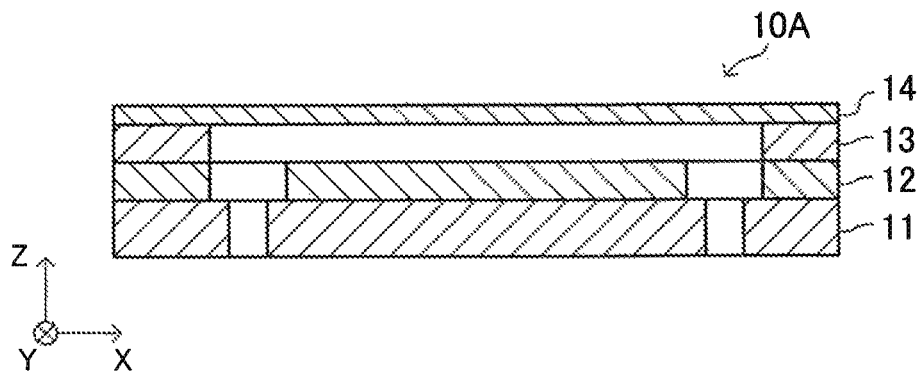
FIG. 8 is a drawing for describing a manufacturing process of the flow passage component shown in FIG. 1.

Subsequently, through punching process with "a mold (punch) and a die", the "through holes corresponding to the flow passages R1 to R5" described above are formed in the ceramics green sheets 11 to 13. Thereafter, the ceramics sheets 11 to 14 are layered, and press-bonded to each other. Lastly, a plurality of the layered ceramics sheets are fired to be united/integrated. With the processes described above, a ceramics layered body 10A shown in FIG. 8 is formed.

(Coupling Treatment Process)

Subsequently, a coupling treatment is applied onto a wall surface of the flow passage (flow passage wall surface). This allows the parylene-film to be easily formed afterward in a state in which the parylene-film preferably adheres to (contacts closely with) the flow passage wall surface. A typical method can be used for the coupling treatment. In the present example, a coupling agent (part No. A-174 manufactured by Momentive Performance Materials Inc.) is dissolved by 1% in a liquid solution (IPA=1:1), and the dissolved solution is kept at a room temperature for 15 minutes. Then, the liquid is poured into the flow passage of the ceramics layered body 10A to thereby apply the coupling agent to the flow passage wall surface. It should be noted that a vapor of the coupling agent may be generated, and the ceramics layered body 10A may be exposed in the vapor to carry out the coupling treatment.

(Forming of the Parylene-Film (Film Formation) Process)

Subsequently, the parylene-film is formed on the surface of the ceramics layered body 10A. As the film formation process for the parylene-film, a known CVD (Chemical Vapor Deposition; Vapor-phase synthesis method) using a solid di-paraxylylene dimer as a deposition source can be adopted. According to this method, di-radical-paraxylylene which is generated as a result of a vaporization and a thermal decomposition of the di-para-xylylene dimer adsorbs onto an exposed surface (including the flow passage wall surface of the flow passage) of the ceramics layered body 10A to thereby generate polymerization reaction.

Figure 9:
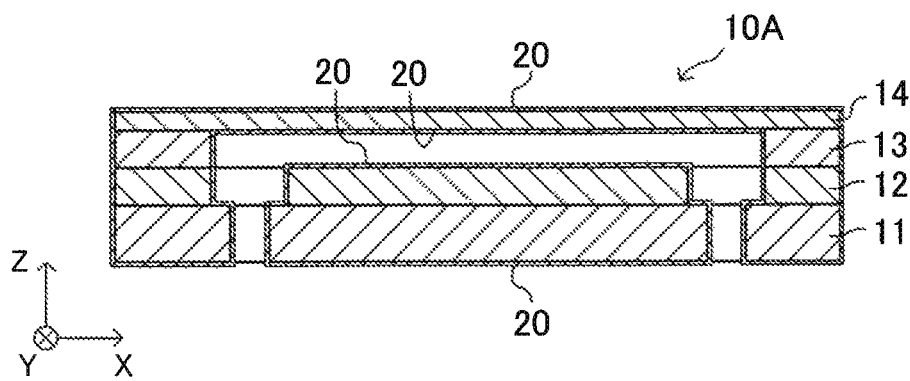
FIG. 9 is a drawing for describing the manufacturing process of the flow passage component shown in FIG. 1.
Figure 10:
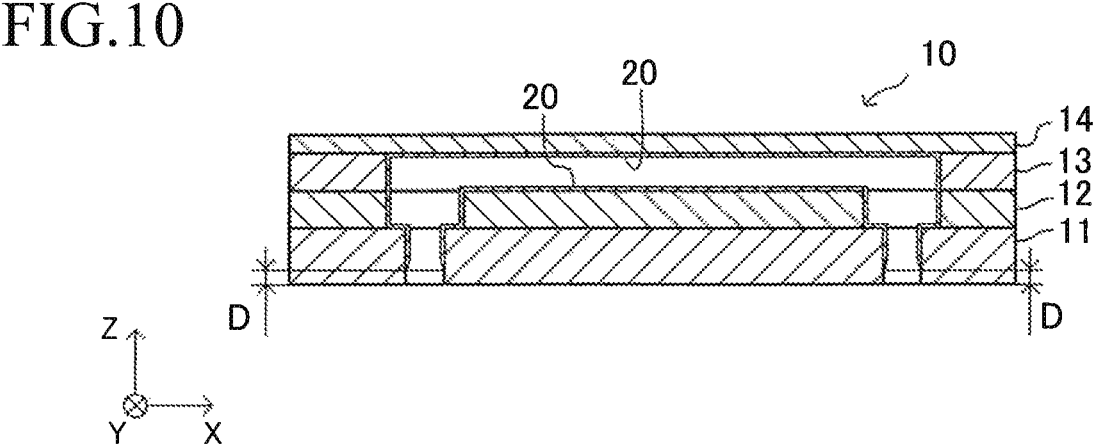
FIG. 10 is a drawing for describing the manufacturing process of the flow passage component shown in FIG. 1.

Consequently, as shown in FIG. 9, the parylene-film 20 is formed not only on the flow passage wall surface of the liquid flow passage but also on an entire surface of the ceramics layered body 10A. It should be noted that the film formation method for the parylene-film 20 is described in detail in, for example, Japanese Patent Application Laid-Open No. Hei 7-101068, Japanese Patent Application Laid-Open No. 2005-153510, Japanese Patent Application Laid-Open No. 2006-159858, and the like. Further, as the material for the parylene-film 20, one or more of polymonochloroparaxylylene, polydichloroparaxylylene, polyparaxylylene, and the like can be used.

(Parylene-Film Eliminating Process)

The parylene-film 20 has a high wettability with respect to liquids other than water. In addition, most of the liquid flowing through the flow passage is different from water. Accordingly, the parylene-film 20 that is formed on portions other than the flow passage (that is, on the outer surfaces of the ceramics layered body 10A) is removed/eliminated.

The parylene-film 20 can be removed/eliminated by a typical elimination method such as polishing, blasting, or the like. After the parylene-film 20 is eliminated, a blast process is carried out, in which abrasive grains are injected to the flow passage wall surface in the vicinity of the discharge opening in an oblique direction.

During the blast process, the abrasive grains reach (go into) a portion having a certain distance from the discharge opening, so that the abrasive grains remove the parylene-film 20 in the vicinity of the discharge opening. As a result, as shown in FIGS. 2 and 7, the parylene-film 20 is formed so as to have its end at the position upstream of the discharge opening by the predetermined distance D along the flow passage wall surface from the discharge opening. In addition, the parylene-film 20 is formed in such a manner that the film thickness t of the film becomes smaller as a portion of the film comes closer to the discharge opening.

Similarly, the abrasive grains remove/eliminate the parylene-film 20 in the vicinity of the inflow opening. As a result, as shown in FIG. 2, the parylene-film 20 is formed so as to have its end at the position downstream of the inflow opening by the predetermined distance D along the flow passage wall surface from the inflow opening. In addition, the parylene-film 20 is formed in such a manner that the film thickness t of the film becomes smaller as a portion of the film comes closer to the inflow opening.

In the meantime, the parylene-film 20 is a relatively hard film. Accordingly, it is preferable that ceramics abrasive grain (e.g., SiC) be used in order to increase a process rate. In this case, if abrasive grains, each having a diameter smaller than the inflow opening and the discharge opening, are used as the abrasive, the abrasive grains enter into the liquid flow passage during the blast process to thereby damage the parylene-film 20. Further, the abrasive which has entered into the liquid flow passage needs to be removed/eliminated, and the elimination is not easily carried out. In contrast, if abrasive grains, each having a diameter larger than the inflow opening and the discharge opening, are used as the abrasive, the ceramics portion located at an edge of the inflow opening and the ceramics portion located at an edge of the discharge opening may be ground.

Meanwhile, a blast method disclosed in, for example, Japanese Patent Application Laid-Open No. 2006-159402, is known. The blast method is a method in which an abrasive formed by fixing "abrasive grains, each having a small diameter" to an "elastic base material having a relatively large diameter" is injected or projected.

Accordingly, a blast process method is preferably used as a method for eliminating the parylene-film 20, in which an abrasive formed by embedding "abrasive grains, each having a small diameter (smaller than the inflow opening and the discharge opening), e.g., SiC" in an "elastic base material having a relatively large diameter (larger than the inflow opening and the discharge opening)" is injected or projected.

According to the blast method described above, since the diameter of the abrasive (base material) is large, the abrasive is hard to enter into the liquid flow passage from "the inflow opening and the discharge opening" during the blast process. Therefore, the blast process does not damage the parylene-film 20 which protects the flow passage wall surface (including the ceramics sheet 14 serving as the vibration plate).

Figure 11:
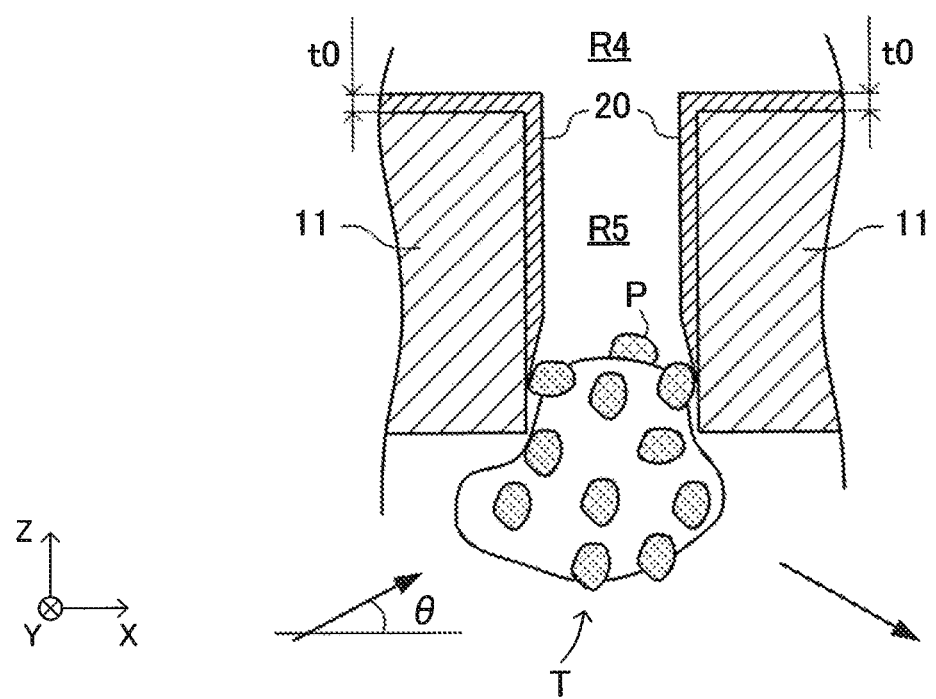
FIG. 11 is a drawing for describing the manufacturing process of the flow passage component shown in FIG. 1.

Further, as shown in FIG. 11, during the blast process, the abrasive T enters (goes) into the flow passage from the discharge opening by a predetermined distance so that the abrasive grain P embedded in the base material (abrasive) T eliminates/removes the parylene-film 20.

As a result, by performing the blast process only, the parylene-film 20 located at the portions other than the flow passage wall surface is eliminated, and simultaneously, as shown in FIGS. 7 and 11, the position of the end of the parylene-film becomes a position upstream of the discharge opening along the flow passage wall surface by the predetermined distance D. Further, the position of the other end of the parylene-film becomes a position downstream of the inflow opening along the flow passage wall surface by the predetermined distance D. Furthermore, the parylene-film 20 is formed in such a manner that the film thickness of the parylene-film 20 becomes smaller as a portion of the film comes closer to the discharge opening, and in such a manner that the film thickness of the parylene-film 20 becomes smaller as a portion of the film comes closer to the inflow opening.

It should be noted that, in the blast process, an injection (or projection) direction $\theta$ may preferably be a direction having an angle other than 90 degrees (a direction different from a normal line of a wall surface of an object to be processed, a direction which is not orthogonal to the wall surface of the object to be processed).

Further, a decrease amount in the film-thickness of the parylene-film 20 per "unit length in a direction toward the discharge opening or the inflow opening" (i.e., degree at which the parylene-film 20 becomes thinner) and the distance D described above can be adjusted by appropriately changing an angle of the blast injection, a time duration of the blast injection, a pressure for the blast injection, or the like.

(Piezoelectric Element Forming Process)

Figure 12:
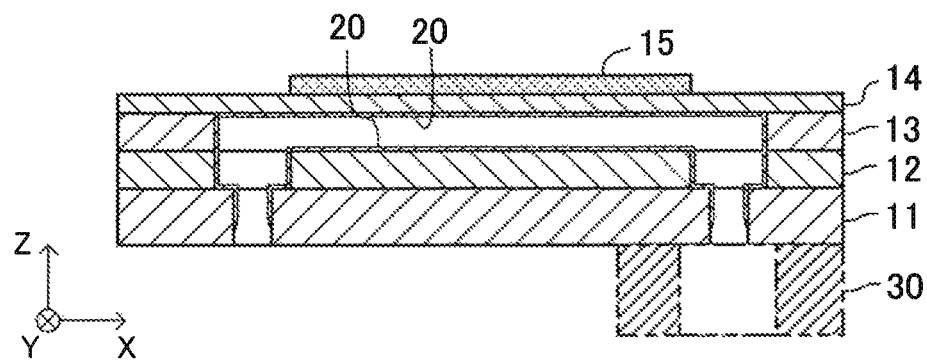
FIG. 12 is a drawing for describing the manufacturing process of the flow passage component shown in FIG. 1.

Thereafter, as shown in FIG. 12, a precursor of the piezoelectric element 15 is placed on the upper surface of the ceramics sheet 14, and then is fired. With the processes described above, the flow passage component 10 shown in FIGS. 1 and 2 is completed.

EXAMPLES

According to the embodiment described above, various examples of the flow passage component 10 were actually produced, as described below. It should be noted that, in those examples, the diameter of the flow passage R5 (diameter of the discharge opening) is 50 μm, and the thickness of the ceramics sheet 11 (length of the flow passage R5 in an axial direction) is 100 μm.

Example 1

The example 1 is a flow passage component using the ceramics sheets 11 to 14, and was produced through eliminating the parylene-film according to a condition/method described below.
Method: Blast
Abrasive:
Size of the base material=Diameter 600 μm.
Material of the base material=ethylene-propylene diene type rubber (elastic body)
Abrasive grain=SiC #2000
Pressure: 0.1 MPa
Injection (projection) angle θ: 25° (65° with respect to the normal line of the object to be processed)
Time duration: 5 minutes
Injection distance: 3 cm
Surface roughness of the example 1 was 43 nm, and the above described distance D of the example 1 was 5 μm.

Example 2

The example 2 is a flow passage component using the ceramics sheets 11 to 14, and was produced through eliminating the parylene-film according to a condition/method described below.
Method: Blast
Abrasive:
Size of the base material=Diameter 1000 μm.
Material of the base material=ethylene-propylene diene type rubber (elastic body)
Abrasive grain=SiC #2000
Pressure: 0.1 MPa
Injection (projection) angle θ: 25° (65° with respect to the normal line of the object to be processed)
Time duration: 5 minutes
Injection distance: 3 cm
Surface roughness of the example 2 was 43 nm, and the above described distance D of the example 2 was 2 μm.

Example 3

The example 3 is a flow passage component using the ceramics sheets 11 to 14, and was produced through eliminating the parylene-film according to a condition/method described below.
Method: Blast
Abrasive:
Size of the base material=Diameter 600 μm.
Material of the base material=ethylene-propylene diene type rubber (elastic body)
Abrasive grain=SiC #2000
Pressure: 0.1 MPa
Injection (projection) angle θ: 40° (50° with respect to the normal line of the object to be processed)
Time duration: 5 minutes
Injection distance: 3 cm
Surface roughness of the example 3 was 43 nm, and the above described distance D of the example 3 was 10 μm.

Example 4

The example 4 is a flow passage component using a first sheet formed of silicon in place of the ceramics sheet 11, and the ceramics sheets 12 to 14, and was produced through eliminating the parylene-film according to a condition/method described below.
Method: Blast
Abrasive:
Size of the base material=Diameter 600 μm.
Material of the base material=ethylene-propylene diene type rubber (elastic body)
Abrasive grain=SiC #2000
Pressure: 0.1 MPa
Injection (projection) angle θ: 25° (65° with respect to the normal line of the object to be processed)
Time duration: 5 minutes
Injection distance: 3 cm
Surface roughness of the example 4 was 22 nm, and the above described distance D of the example 4 was 7 μm.

Example 5

The example 5 is a flow passage component using a first sheet formed of SUS in place of the ceramics sheet 11, and the ceramics sheets 12 to 14, and was produced through eliminating the parylene-film according to a condition/method described below.
Method: Blast
Abrasive:
Size of the base material=Diameter 600 μm.
Material of the base material=ethylene-propylene diene type rubber (elastic body)
Abrasive grain=SiC #2000
Pressure: 0.1 MPa
Injection (projection) angle θ: 25° (65° with respect to the normal line of the object to be processed)
Time duration: 5 minutes
Injection distance: 3 cm
Surface roughness of the example 5 was 54 nm, and the above described distance D of the example 5 was 3 μm.

Next, the thus produced flow passage components 10 were evaluated. The evaluation method is as follows.

A comparative example was produced, using the manufacturing method described above except the process for eliminating the parylene-film, and eliminating the parylene-film as described below. The comparative example is a flow passage component using the ceramics sheets 11 to 14.

<Method/Process for Eliminating the Parylene-Film for the Comparative Example>
Method: Polishing (without blast)
Abrasive: Abrasive grain=SiC #2000

Polishing according to the above method was performed till surface roughness reached 40 nm. The film thickness of the parylene-film was constant all through up to the ends of the film, and the above described distance D of the comparative example was 0 μm. That is, the film thickness of the parylene-film on the flow passage wall surface was constant throughout the flow passage from the inflow opening to the discharge opening.

<Evaluation Method>

When the ink is pushed out under 0.1 MPa from the discharge opening for 1 minute after the ink is filled into the flow passage, a distance of the ink which goes around the outer wall surface 11a where the discharge opening is formed is measured, and it is checked whether or not the parylene-film of the inner wall in the vicinity of the discharge opening comes off. The number of samples (n-number) was 40. The inspection was carried out with a microscope having a magnification of 100.

The evaluation result is as follows.

Example 1

The distance of the going around ink: 0 μm.
The parylene-film coming off: 0 out of 40 samples.

Example 2

The distance of the going around ink: 0 μm.
The parylene-film coming off: 0 out of the 40 samples.

Example 3

The distance of the going around ink: 0 μm.
The parylene-film coming off: 0 out of the 40 samples.

Example 4

The distance of the going around ink: 0 μm.
The parylene-film coming off: 0 out of the 40 samples.

Example 5

The distance of the going around ink: 0 μm.
The parylene-film coming off: 0 out of the 40 samples.

Comparative Example

The distance of the going around ink: 3 μm.
The parylene-film coming off: 3 out of the 40 samples.

It is confirmed that, in the flow passage component 10 according to the embodiment of the present invention, the possibility that the liquid to be discharged from the discharge opening goes around the "outer wall surface 11a on which the discharge opening is formed" is low, and the possibility that the parylene-film 20 comes off is low.

As described above, the flow passage component 10 according to the embodiment of the present invention is a component 10 in which a discharge opening for discharging a liquid to an outside space is formed on an outer wall surface 11a exposed to the outside space, and a flow passage (R1-R5) of the liquid is formed in its inside, the flow passage having the discharge opening at one end of the flow passage, wherein, a flow passage wall surface forming the flow passage is covered by/with a protection film 20 formed of a paraxylylene-based polymer, and the protection film 20 is formed so as to have its end at a position upstream of the discharge opening by a predetermined distance D along the flow passage wall surface from the discharge opening.

Accordingly, since the parylene-film 20 is not present in the vicinity of the discharge opening, the "wettability with respect to the liquid flowing through the flow passage" of the flow passage wall surface in the vicinity of the discharge opening can be lowered. As a result, the possibility that the liquid to be discharged from the discharge opening goes around the "outer wall surface 11a on which the discharge opening is formed" is decreased. Therefore, the flow passage component 10 can stably discharge the liquid.

It should be noted that the present invention should not be limited to the embodiments described above, but various modifications may be adopted without departing from the scope of the invention. For example, as shown in FIG. 12, another member 30 may be joined to the lower portion of the inflow opening. In addition, as shown in FIG. 13, the film-thickness of the parylene-film 20' at the end of the parylene-film 20' may not necessarily become smaller as a portion of the film comes closer to the discharge opening (and/or the inflow opening).

Further, as described above, the material of the flow passage component is not specifically limited. That is, the flow passage component may be composed of ceramics, silicon, metal (e.g., SUS), or the like, or may be made as a complex of those materials. It should be noted that, when the flow passage is formed of ceramics in a unified manner, it has a high strength. Accordingly, it is preferable that the flow passage component be formed of ceramics in a unified manner.

The invention claimed is:

1. A flow passage component comprising a discharge opening for discharging a liquid to an outside space is formed on an outer wall surface exposed to said outside space, and a flow passage of said liquid is formed in its inside, said flow passage having a flow passage wall surface having a hollow passage shape with said discharge opening at one end of said flow passage, wherein, said flow passage wall surface forming said flow passage is covered with a protection film formed of a paraxylylene-based polymer, and said protection film is formed so as to have said protection film end at a position upstream of said discharge opening by a predetermined distance along said flow passage wall surface from said discharge opening, and said flow passage wall surface has a substantially constant hollow passage shape that extends to the outermost exposed edge of the said discharge opening.

2. The flow passage component according to claim 1, wherein, said protection film is formed in such a manner that a film thickness of a portion of said protection film becomes smaller as said portion comes closer to said discharge opening.

3. The flow passage component according to claim 1, wherein the predetermined distance of said protection film end from said discharge opening is greater than 0 μm and equal to or smaller than 10 μm.

* * * * *